Aug. 12, 1958 J. A. BRIED 2,846,719
CONTINUOUS FOWL PICKING MACHINE
Filed Nov. 4, 1954
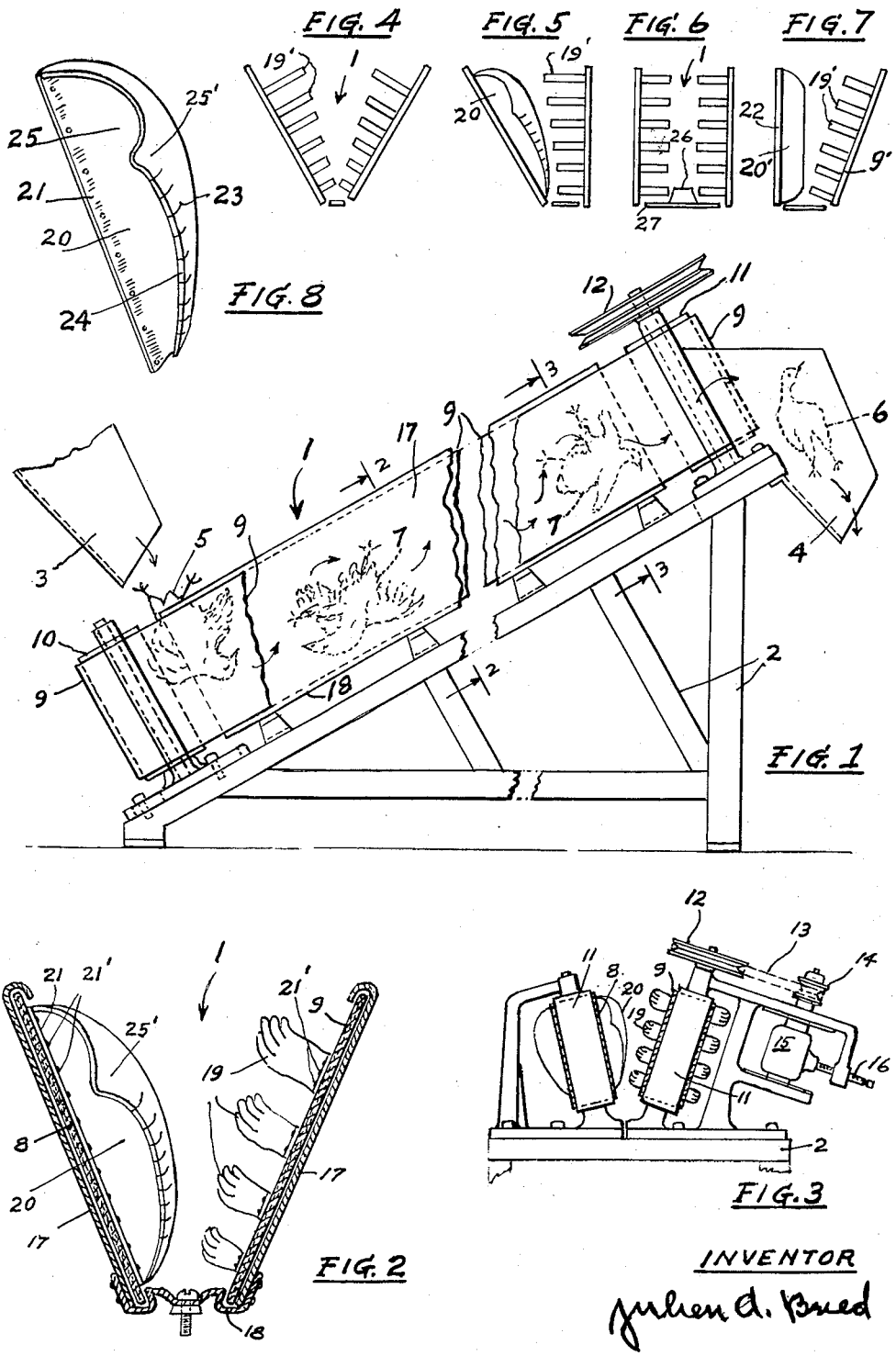
INVENTOR
Julien A. Bried

United States Patent Office 2,846,719
Patented Aug. 12, 1958

2,846,719

CONTINUOUS FOWL PICKING MACHINE

Julien A. Bried, Berkeley, Calif., assignor to Honolulu Oil Corporation, a corporation of Delaware Application November 4, 1954, Serial No. 466,835

12 Claims. (Cl. 17—11.1)

This invention relates to apparatus for defeathering fowl and has for its object a simpler method and means for effectively doing this work and in a continuous flow system if desired, all as described in the following specification and accompanying drawings.

In the drawings:

Fig. 1 is a side elevation of the aparatus broken in length and omitting the driving motors and the friction elements from the belts, for clarity of the drawing.

Fig. 2 is an enlarged cross section of Fig. 1 taken along the line 2—2 showing the manner of supporting the endless belts to form the side walls of the trough, and also showing the friction elements projecting from the confronting walls of the belts.

Fig. 3 is a reduced cross sectional view of Fig. 1 as seen from the line 3—3 showing the motor drive as may be applied to each belt.

Figs. 4, 5, 6 and 7 are diagrammatic drawings showing some of the variations in the cross sectional form of the trough which may be used.

Fig. 8 is a perspective view of one form of the larger frictional elements or hold back baffles.

Before describing the apparatus in detail a short explanation of the invention will be given to make the details more easily understood. Briefly stated the novel system of defeathering fowl comprises passing the dead and preferably hot water dipped wet fowls one after another through a straight trough, at least one side of, and preferably both confronting sides of which trough are provided with projecting frictional feather engaging elements on their surfaces, and the two sides of the trough are given relative longitudinal movement against opposite sides of the fowls sufficiently fast to turn and tumble the fowls rapidly about in most every direction to bring all parts of the fowls into contact with the frictional elements, while at the same time moving the fowls bodily along the trough and discharge them from one end thereof, which is open.

Preferably also, the sides of the trough are slanted downwardly and inwardly to make the trough narrower at the bottom or V-shaped, so that the fowls will automatically fall into contact with the moving frictional elements as the fowls are tumbled about.

The trough may be level or extend at an angle, preferably upwardly to the discharge end, so as to carry the fowls up grade as they move along in being picked as this puts more resistance on the fowls and aids in tumbling them about.

At least one, and preferably both of the confronting sides of the trough are each formed of one run of an endless belt running over rolls or pulleys at the ends of the trough, and which belts may be slidably supported against boards or metal outer walls to hold the belts in trough form. These belts may be of canvas, rubber, plastic, woven wire, or chain, all as commonly known and used in the conveyor art. The belt or belts being moved by motors or any suitable drive, and preferably a separate drive for each belt each provided with adjustable speed means to greatly vary the speed of the trough belt it is driving to get the best effect.

In the drawings Fig. 1, the trough generally is designated 1, 2 is a suitable frame supporting the trough at a slant extending upward to the discharge end. 3 indicates a chute delivering fowl to the lower end of the trough, 4 is a discharge chute for the fowls. 5 is a fowl entering the trough, 6 is a fowl discharging therefrom, and 7 a fowl in transit tumbling over.

In construction shown in Figs. 1, 2 and 3 the two endless belts are designated 8 and 9 and are shown spaced apart and arranged at an angle to form an open trough of V cross section between them. The belts each pass over two end rolls or pulleys 10, 11, the distance between which should be adjustable to take up the slack in the belts, as well known in the art, and one end pulley of each belt is power driven as by a V belt pulley 12, drive belt 13 to a variable diameter drive pulley at 14 on a motor 15 adjustably mounted as at 16. Any other equivalent variable speed drive may be used.

Between the end pulleys the trough belts are preferably supported by a backing board or plate 17 and the lower edge of each belt is preferably also supported in a grooved extension 18 from the backing plate 17.

Secured to and projecting from the confronting surfaces of at least one of the trough belts, and preferably from both, are flexible frictional elements or devices in the form of fingers, baffles, or ribs of soft frictional material such as roughened or ribbed rubber. These devices may take various forms and two of them are indicated at 19 and 20 in Fig. 2, preferably riveted or otherwise secured to the belts as indicated at 21′, though if one belt is of a very rough surface to yield enough friction against the fowls the larger projections could be dispensed with on that belt.

To understand clearly the action of these belts on the fowls, one belt may be called the picking belt and the other the hold-back belt (though they both actually grip the feathers of the fowls) and if both were of equal frictional grip against the feathers of a fowl dropped between the two belts, and if both belts were traveling in the same direction at the same speed, the fowl would simply be conveyed bodily along the trough at that speed and discharged at the end of the trough not picked. But if one belt were traveling faster than the other, or the friction of one belt was somewhat greater than the other, the fowl fould be given a tumbling and turning action and subjected to friction from both belts and would travel and emerge with most of the feathers picked, if the trough were long enough.

However, if the belts were going in opposite directions, at the same speed and of equal friction, a fowl dropped between them would roll or spin around between the belts without traveling bodily in either direction along the trough, and while the friction against the fowl (on account of its not being a round ball) would remove the feathers, the fowl would not discharge from the trough—and the apparatus would not form a continuous fowl picking machine, though the fowl could be forcibly grabbed and pulled out, especially if held by a string or chain from one foot, kept upward.

It will, therefore, be seen that if one of the oppositely moving belts travels somewhat slower than the other, and depending on their relative frictional capacity, the fowl can be made to travel along the trough quite slowly —say a foot or two a second, so that with a trough about 9 to 14 feet long the fowl will have time enough to become completely picked all over by the time they emerge—or they may be run consecutively through two machines say each about 7 to 10 feet long with the fowl (if chickens) spaced about one second apart, from any continuous feeding or delivery source. (For turkeys the spacing will be much greater.)

It has been found that the relative passing speeds of the belts for best picking effect with least injury to the birds is from about 1,000 to 2,500 feet or more per minute. But this depends somewhat on the nature of the frictional elements with which the belts are equipped.

From the above, it will be evident that with frictional devices of great "hold back" capacity secured to one side of the trough there need be a traveling picker belt on the other side only, but this would require a much longer trough to yield the same picking efficiency as with two belts running in opposite directions. Such a one side movable construction could take the form shown in diagram Fig. 7 wherein the vertical wall 22 of the trough may be considered to be stationary and secured to it are high flexible "hold back" baffles 20' to greatly retard the bodily movement of the fowl along the trough, while the moving belt 9' forming the opposite slanted wall of the trough carries the projecting flexible frictional picking elements 19'. Obviously this one side drive arrangement may be applied to a trough of any other cross section.

For fowls of substantially one size the walls of the trough could be vertical as shown in diagram Fig. 6, especially if some baffles 26 were spaced along bottom wall 27 of the trough, but better turning and tumbling about of the fowls is secured by having one or both walls slanted inwardly toward the bottom of the trough as indicated in diagrams Figs. 4 and 5 to form a V-shaped trough space between them.

The frictional picking elements 19 or "fingers" may vary in form as well known in the mechanical fowl picking art but I find better control with these picking elements shaped approximately like the forefingers of the human hand grouped and curved partially inward, and for the "hold back" wall or belt the use of special baffles of rubber-like material of curved pocket-like form, indicated at 20 in Fig. 2 and shown in perspective in Fig. 8, will greatly aid in holding back the fowls and turning them over and tumbling them about.

In the perspective view Fig. 8 it will be seen that the hold-back baffles comprise an elongated flexible curved sheet of thick rubber-like material 20, preferably of the same general construction as an automobile outer tire, preferably roughened or ribbed as previously stated and formed with an increasing larger hollow curved pocket 25 extending from a straight attaching margin 21, the outer side of the pocket being preferably curved over to a considerable degree at its upper portion as at 25' and decreasingly toward the lower end, and preferably of thinner material or slotted at intervals as at 23 along its curved margin 24 to make it more flexible. This form tends to trap and reverse the fowls, one after another, as well as greatly enhance the picking effect, and may be used on both sides of the trough, but preferably of much smaller size on the "picking" belt, and with the open pockets preferably facing the opposite way from the hold-back baffle pockets.

In operation it is desirable to lightly spray the fowl with water. The feathers will largely fall through the bottom of the trough and at the ends of the belt guides 18 and others thrown out by centrifugal force at the end of the trough.

In the appended claims the use of the word "rubber" is intended to include also any other material having the properties set out.

Having thus described my improved fowl defeathering apparatus and several variations in its construction and variations in the manner of its operation, what I claim is:

1. A fowl picking machine comprising spaced walls forming the sides of an elongated straight trough of a size to receive and support fowls therein for being tumbled about therealong and defeathered, at least one of said walls being an endless belt and means for driving said belt rapidly, said belt provided with spaced flexible frictional fowl defeathering fingers projecting from its inner side into the trough arranged to strike and tumble fowls about therein and move them bodily along said trough when the belt is running and remove the feathers.

2. A fowl picking machine comprising spaced walls forming the sides of an elongated straight trough of a size to receive and support fowls therein for being tumbled about therealong and defeathered, at least one of said walls being an endless belt and means for driving said belt rapidly, said belt provided with spaced flexible frictional fowl defeathering fingers projecting from its inner side into the trough arranged to strike and tumble fowls about therein and move them bodily along said trough when the belt is running and remove the feathers, and the other wall of the trough provided with spaced flexible fowl retarding elements projecting inwardly of the trough.

3. A fowl picking machine comprising spaced walls forming the sides of an elongated straight trough of a size to receive and support fowls therein for being tumbled about therealong and defeathered, at least one of said walls being an endless belt and means for driving said belt rapidly, said belt provided with spaced flexible frictional fowl defeathering fingers projecting from its inner side into the trough arranged to strike and tumble fowls about therein and move them bodily along said trough when the belt is running and remove the feathers, said trough being upwardly inclined in direction the fowls are moved sufficiently to aid in retarding their bodily movement by gravity and aid in their tumbling about to expose all of their parts to the action of the defeathering fingers.

4. In a structure as set out in claim 2 said other wall also being an endless belt and provided with means for driving it rapidly.

5. In a structure as set out in claim 2, said trough being inclined upwardly in direction of the bodily movement of the fowls sufficiently to aid in retarding of the bodily movement of the fowls and aid in their tumbling about to expose all of their parts to the action of the defeathering fingers.

6. In a structure as set out in claim 1, a bottom wall on said trough provided with upwardly extending spaced frictional feather engaging elements.

7. In a structure as set out in claim 1 opening means at the bottom of the trough for loosened feathers to fall through.

8. In a structure as set out in claim 1 said walls relatively tilted transversely of the trough so that the trough formed between them will converge toward the bottom.

9. In a structure as set out in claim 2 said other wall also being an endless belt and provided with means for driving it rapidly, and means to vary the speeds of the belts relatively to control the bodily travel of the fowls in the trough.

10. In a fowl picking machine, means forming a path adapted to support and confine loose fowl for tumbling about thereon and moving therealong, and means mounting a series of soft flexible resilient frictional picking fingers for moving rapidly along said path in engaging relation to fowl on said path for defeathering the fowl while tumbling them about and tending to urge them bodily therealong, means for so moving said fingers, a series of spaced baffles along said path each comprising an elongated flexible, resilient rubber flap with an attaching margin along one edge, and the body of the flap extending away from said margin while gradually curving over toward said margin in a manner to form an open receiving pocket for the moving fowl to partially enter so as to temporarily trap and release them and aid in turning the fowls over when the machine is operated, the curved over portion of the flap being deeply slotted at spaced intervals along its free edge and roughened on its fowl contacting surface.

11. In a structure as set out in claim 10, said open receiving pocket increasing in breadth and depth from one end of the flap to the other.

12. In a fowl picking machine, means forming a path adapted to support and confine loose fowl for tumbling about thereon and moving therealong, and means mounting a series of picking elements for moving rapidly along said path in engaging relation to fowl on said path for defeathering the fowl while tumbling them about and tending to urge them bodily therealong, means for so moving said elements, said elements comprising each a soft flexible body of resilient rubber-like material normally shaped substantially like the grouped forefingers of the human hand curved partially inward and adapted to bend and spread against the tendency to recover said normal shape when forcibly distorted in contacting the fowl, and roughened on the contacting surfaces to frictionally grip the feathers of the fowl.

References Cited in the file of this patent

UNITED STATES PATENTS

| | | |
|---|---|---|
| 655,277 | Simpson | Aug. 7, 1900 |
| 1,388,394 | Witt | Aug. 23, 1921 |
| 1,834,479 | Taylor | Dec. 1, 1931 |
| 1,980,034 | Budd et al. | Nov. 6, 1934 |
| 1,994,780 | Mead | Mar. 19, 1935 |
| 2,433,730 | Bridge | Dec. 30, 1947 |
| 2,617,102 | MacHenry | Nov. 11, 1952 |
| 2,627,627 | McDougall | Feb. 10, 1953 |
| 2,691,795 | Barker et al. | Oct. 19, 1954 |
| 2,754,539 | Toti | July 17, 1956 |

OTHER REFERENCES

"Manual of Artificial Limbs," published by A. A. Marks, 701 Broadway, New York, N. Y., copyright 1905, pp. 188 and 189.